(12) United States Patent
St. Laurent et al.

(10) Patent No.: US 8,479,234 B2
(45) Date of Patent: Jul. 2, 2013

(54) METHOD AND SYSTEM FOR MONITORING AND CONTROLLING A LOCAL COLLECTION FACILITY FROM A REMOTE FACILITY USING AN ASYNCHRONOUS TRANSFER MODE (ATM) NETWORK

(75) Inventors: Darren M. St. Laurent, Stevenson Ranch, CA (US); Daniel M. Miner, Redondo Beach, CA (US); David T. Boltz, La Mirada, CA (US); Carl D. Ostrom, Nevada City, CA (US); Mitchell B. Wasden, Redondo Beach, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 491 days.

(21) Appl. No.: 11/854,433

(22) Filed: Sep. 12, 2007

(65) Prior Publication Data

US 2009/0070846 A1 Mar. 12, 2009

(51) Int. Cl.
*H04N 7/20* (2006.01)

(52) U.S. Cl.
USPC ............... 725/63; 725/67; 725/68; 725/71

(58) Field of Classification Search
USPC .......................... 725/63, 67–68, 71
See application file for complete search history.

(56) References Cited

U.S. PATENT DOCUMENTS

| | | | |
|---|---|---|---|
| 4,317,010 A | 2/1982 | Fillot | |
| 4,984,252 A | 1/1991 | Morimoto | |
| 5,155,483 A | 10/1992 | Morimoto | |
| 5,189,516 A | 2/1993 | Angell et al. | |
| 5,257,106 A | 10/1993 | Maruoka | |
| 5,323,322 A | 6/1994 | Mueller et al. | |
| 5,351,130 A | 9/1994 | Dugan et al. | |
| 5,499,046 A | 3/1996 | Schiller et al. | |
| 5,566,353 A | 10/1996 | Cho et al. | |
| 5,583,562 A | 12/1996 | Birch et al. | |
| 5,600,573 A * | 2/1997 | Hendricks et al. | ............ 725/109 |

(Continued)

FOREIGN PATENT DOCUMENTS

WO 03/058967 A1 7/2003

OTHER PUBLICATIONS

"Specification for the Use of Video and Audio Coding in DVB Services Delivered Directly Over IP Protocols"; DVB Document Rev. 2; May 2007.

(Continued)

*Primary Examiner* — Pankaj Kumar
*Assistant Examiner* — Mulugeta Mengesha

(57) ABSTRACT

A system of local television signals includes a plurality of local collection facilities. Each a local collection facilities includes a plurality of primary receiver decoder circuit modules comprising a first receiver decoder circuit module. The first receiver decoder circuit module receives a first channel signal and forms a first decoded signal. The local collection facility also includes an encoder in communication with the first receiver decoder circuit module forming an encoded signal. A multiplexer multiplexing the first encoded signal into a multiplexed signal and a network switch communicating the multiplexed signal through a network. Collectively, the plurality of local collection facilities communicates a plurality of multiplexed signals through the network. The system also includes a remote collection facility in communication with the plurality of local collection facilities that generate an output signal in response to the plurality of multiplexed signals. The multiplexed signal may be formed into ATM signals before communication through the network.

23 Claims, 9 Drawing Sheets

U.S. PATENT DOCUMENTS

| | | | |
|---|---|---|---|
| 5,646,675 | A | 7/1997 | Copriviza et al. |
| 5,659,350 | A | 8/1997 | Hendricks et al. |
| 5,666,293 | A | 9/1997 | Metz et al. |
| 5,684,714 | A | 11/1997 | Yogeshwar et al. |
| 5,926,230 | A | 7/1999 | Nijima et al. |
| 5,933,123 | A | 8/1999 | Kaul |
| 6,047,162 | A | 4/2000 | Lazaris-Brunner et al. |
| 6,154,772 | A | 11/2000 | Dunn et al. |
| 6,308,286 | B1 | 10/2001 | Richmond et al. |
| 6,401,242 | B1 | 6/2002 | Eyer et al. |
| 6,434,562 | B1 | 8/2002 | Pennywitt et al. |
| 6,529,146 | B1 | 3/2003 | Kowalski et al. |
| 6,557,031 | B1 | 4/2003 | Mimura et al. |
| 6,625,811 | B1 | 9/2003 | Kaneko |
| 6,654,923 | B1 | 11/2003 | Grenier et al. |
| 6,741,553 | B1 | 5/2004 | Grenier |
| 6,782,550 | B1 | 8/2004 | Cao |
| 6,795,506 | B1 | 9/2004 | Zhang et al. |
| 6,873,877 | B1 | 3/2005 | Tobias et al. |
| 6,910,078 | B1 | 6/2005 | Raman et al. |
| 7,039,116 | B1* | 5/2006 | Zhang et al. ............ 375/240.26 |
| 7,039,937 | B1 | 5/2006 | Glenn |
| 7,072,365 | B1 | 7/2006 | Ansley |
| 7,209,636 | B2 | 4/2007 | Imahashi et al. |
| 7,212,738 | B1 | 5/2007 | Wang |
| 7,219,367 | B2 | 5/2007 | Briggs |
| 7,224,837 | B2 | 5/2007 | Olshansky et al. |
| 7,302,224 | B2 | 11/2007 | Sibley et al. |
| 7,315,887 | B1 | 1/2008 | Liang et al. |
| 7,333,425 | B2 | 2/2008 | Huck et al. |
| 7,346,918 | B2 | 3/2008 | Hennenhoefer et al. |
| 7,380,264 | B2 | 5/2008 | Potrebic |
| 7,460,832 | B2 | 12/2008 | Lee et al. |
| 7,493,648 | B2 | 2/2009 | Hisamatsu et al. |
| 7,525,993 | B2 | 4/2009 | Yousef |
| 7,529,276 | B1 | 5/2009 | Ramakrishnan |
| 7,580,612 | B2 | 8/2009 | Sato et al. |
| 7,596,350 | B1 | 9/2009 | Ladrach |
| 7,602,846 | B1 | 10/2009 | Wu et al. |
| 7,607,154 | B2 | 10/2009 | Morello |
| 7,650,620 | B2 | 1/2010 | Fish et al. |
| 7,746,791 | B2 | 6/2010 | Wimmer |
| 8,139,517 | B2 | 3/2012 | Oger et al. |
| 2001/0003846 | A1 | 6/2001 | Rowe et al. |
| 2001/0026537 | A1 | 10/2001 | Massey |
| 2001/0036198 | A1 | 11/2001 | Arsenault et al. |
| 2002/0007494 | A1 | 1/2002 | Hodge |
| 2002/0023165 | A1 | 2/2002 | Lahr |
| 2002/0053049 | A1 | 5/2002 | Shiomoto et al. |
| 2002/0105976 | A1 | 8/2002 | Kelly et al. |
| 2002/0150061 | A1 | 10/2002 | Arsenault |
| 2002/0186320 | A1 | 12/2002 | Carlsgaard et al. |
| 2002/0194596 | A1 | 12/2002 | Srivastava |
| 2003/0007564 | A1 | 1/2003 | Jeong |
| 2003/0018975 | A1 | 1/2003 | Stone |
| 2003/0028897 | A1* | 2/2003 | Brooks ..................... 725/129 |
| 2003/0088873 | A1 | 5/2003 | McCoy et al. |
| 2003/0095554 | A1 | 5/2003 | Shimizu |
| 2003/0140353 | A1* | 7/2003 | Hugenberg et al. ......... 725/148 |
| 2003/0161262 | A1 | 8/2003 | Hosoi |
| 2003/0196211 | A1 | 10/2003 | Chan |
| 2003/0217362 | A1 | 11/2003 | Summers et al. |
| 2004/0001478 | A1 | 1/2004 | Wong |
| 2004/0022275 | A1 | 2/2004 | Blanchard |
| 2004/0022535 | A1 | 2/2004 | Wang et al. |
| 2004/0078807 | A1 | 4/2004 | Fries et al. |
| 2004/0117831 | A1 | 6/2004 | Ellis et al. |
| 2004/0120349 | A1 | 6/2004 | Border et al. |
| 2004/0181813 | A1 | 9/2004 | Ota et al. |
| 2004/0216171 | A1 | 10/2004 | Barone et al. |
| 2004/0234145 | A1 | 11/2004 | Yatabe et al. |
| 2004/0255333 | A1* | 12/2004 | Kenworthy ................. 725/129 |
| 2005/0002339 | A1 | 1/2005 | Patil et al. |
| 2005/0076134 | A1* | 4/2005 | Bialik et al. ................. 709/230 |
| 2005/0086696 | A1 | 4/2005 | Daniels |
| 2005/0099969 | A1 | 5/2005 | Roberts et al. |
| 2005/0155079 | A1* | 7/2005 | Chen et al. .................... 725/115 |
| 2005/0160477 | A1 | 7/2005 | Saito |
| 2005/0175085 | A1 | 8/2005 | Bergen et al. |
| 2005/0210123 | A1 | 9/2005 | Wang et al. |
| 2005/0210133 | A1 | 9/2005 | Florissi et al. |
| 2005/0240967 | A1 | 10/2005 | Anderson et al. |
| 2006/0018254 | A1 | 1/2006 | Sanders et al. |
| 2006/0035610 | A1 | 2/2006 | Potrebic |
| 2006/0050184 | A1 | 3/2006 | McMiller et al. |
| 2006/0064726 | A1 | 3/2006 | Loner |
| 2006/0083315 | A1 | 4/2006 | Sato et al. |
| 2006/0085834 | A1 | 4/2006 | Chang et al. |
| 2006/0098735 | A1 | 5/2006 | Chang |
| 2006/0126634 | A1 | 6/2006 | Park |
| 2006/0166699 | A1* | 7/2006 | Aghvami et al. .......... 455/552.1 |
| 2006/0198389 | A1* | 9/2006 | Eriokson et al. ............. 370/466 |
| 2006/0242674 | A1 | 10/2006 | Medford et al. |
| 2007/0002851 | A1 | 1/2007 | Paila et al. |
| 2007/0022438 | A1 | 1/2007 | Arseneau et al. |
| 2007/0040933 | A1 | 2/2007 | Seong |
| 2007/0053379 | A1 | 3/2007 | Hershey et al. |
| 2007/0079351 | A1 | 4/2007 | Wang et al. |
| 2007/0091857 | A1 | 4/2007 | Elstermann |
| 2007/0094691 | A1 | 4/2007 | Gazdzinski |
| 2007/0118861 | A1 | 5/2007 | Stone |
| 2007/0136765 | A1 | 6/2007 | Shah et al. |
| 2007/0136777 | A1 | 6/2007 | Hasek et al. |
| 2007/0157281 | A1 | 7/2007 | Ellis et al. |
| 2007/0162927 | A1 | 7/2007 | Ramaswamy et al. |
| 2007/0186251 | A1 | 8/2007 | Horowitz et al. |
| 2007/0204300 | A1 | 8/2007 | Markley et al. |
| 2007/0204311 | A1 | 8/2007 | Hasek et al. |
| 2007/0261073 | A1 | 11/2007 | Blumenschein et al. |
| 2007/0263627 | A1 | 11/2007 | Karino et al. |
| 2007/0268817 | A1 | 11/2007 | Smallegange et al. |
| 2007/0291713 | A1 | 12/2007 | Machida |
| 2008/0066096 | A1 | 3/2008 | Wollmershauser et al. |
| 2008/0069155 | A1 | 3/2008 | Honhart |
| 2008/0101455 | A1 | 5/2008 | Scheelke |
| 2008/0102750 | A1* | 5/2008 | Keener et al. ..................... 455/7 |
| 2008/0137543 | A1 | 6/2008 | Mitra |
| 2008/0201748 | A1 | 8/2008 | Hasek et al. |
| 2008/0282011 | A1 | 11/2008 | Tsai et al. |
| 2008/0291907 | A1 | 11/2008 | Rogasch |
| 2009/0022241 | A1* | 1/2009 | Fukuoka et al. .............. 375/298 |
| 2009/0025027 | A1 | 1/2009 | Craner |
| 2009/0052323 | A1 | 2/2009 | Breynaert et al. |
| 2009/0066848 | A1 | 3/2009 | St. Laurent et al. |
| 2009/0067365 | A1 | 3/2009 | Pham et al. |
| 2009/0067432 | A1 | 3/2009 | St. Laurent et al. |
| 2009/0067433 | A1 | 3/2009 | St. Laurent et al. |
| 2009/0067490 | A1 | 3/2009 | Barroso |
| 2009/0069021 | A1 | 3/2009 | Barroso |
| 2009/0070824 | A1 | 3/2009 | Barroso |
| 2009/0070825 | A1 | 3/2009 | Pham et al. |
| 2009/0070830 | A1 | 3/2009 | Pham et al. |
| 2009/0070846 | A1 | 3/2009 | St. Laurent et al. |
| 2009/0109836 | A1 | 4/2009 | Wasden et al. |
| 2009/0109883 | A1 | 4/2009 | Wasden et al. |
| 2009/0110052 | A1 | 4/2009 | Wasden et al. |
| 2009/0113490 | A1 | 4/2009 | Wasden et al. |
| 2009/0213814 | A1 | 8/2009 | Heo et al. |
| 2009/0254962 | A1 | 10/2009 | Hendricks et al. |
| 2010/0208595 | A1 | 8/2010 | Zhao et al. |

OTHER PUBLICATIONS

Non-final Office action dated Aug. 4, 2010 in U.S. Appl. No. 11/929,252, filed Oct. 30, 2007 by Mitchell B. Wasden et al.

* cited by examiner

METHOD AND SYSTEM FOR MONITORING AND CONTROLLING A LOCAL COLLECTION FACILITY FROM A REMOTE FACILITY USING AN ASYNCHRONOUS TRANSFER MODE (ATM) NETWORK

TECHNICAL FIELD

The present disclosure relates generally to communication systems, and more particularly to a method and system for monitoring and controlling the switching of a back-up receiver decoder circuit module at a local collection facility from a remote facility of a signal collection and uplinking system.

BACKGROUND

The statements in this section merely provide background information related to the present disclosure and may not constitute prior art.

Satellite broadcasting of television signals has increased in popularity. Satellite television providers continually offer more and unique services to their subscribers to enhance the viewing experience. Providing reliability in a satellite broadcasting system is therefore an important goal of satellite broadcast providers. Providing reliable signals reduces the overall cost of the system by reducing the number of received calls at a customer call center.

In satellite broadcasting systems, users have come to expect the inclusion of local channels in addition to the channels broadcast for the entire Continental United States. Collecting the channels may be performed in various manners, including providing a manned station that receives the signals. The signals may be uplinked from various locations. Providing manned stations increases the labor costs and thus increases the overall cost of the service.

SUMMARY

The present disclosure provides a means for monitoring and controlling a receiver decoder circuit module in a signal collection system at a central facility.

In one aspect of the invention, a method of forming an output signal includes providing a plurality of primary receiver decoder circuit modules at a local collection facility, said plurality of receiver decoder circuit modules comprising a first receiver decoder circuit module, receiving a plurality of channel signals, said plurality of channel signals having a first channel signal, communicating the first channel signal to the first receiver decoder circuit module, decoding the first channel signal to form a first decoded signal, encoding the first decoded signal at a first encoder module into a first encoded signal, multiplexing the first encoded signal into a multiplexed signal, forming an Asynchronous Transfer Mode (ATM) signal from the multiplexed signal at a network adapter, communicating the ATM signal from the local collection facility through an ATM network backhaul to a remote collection facility and generating the output signal at the remote facility in response to the ATM signal.

In a further aspect of the invention, a system includes a local collection facility with a plurality of primary receiver decoder circuit modules comprising a first receiver decoder circuit module. The local collection facility also includes a first receiver decoder circuit module receiving a first channel signal and forming a first decoded signal. he Local collection facility also includes an encoder in communication with the first receiver decoder circuit module forming an encoded signal and a multiplexer multiplexing the first encoded signal into a multiplexed signal.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
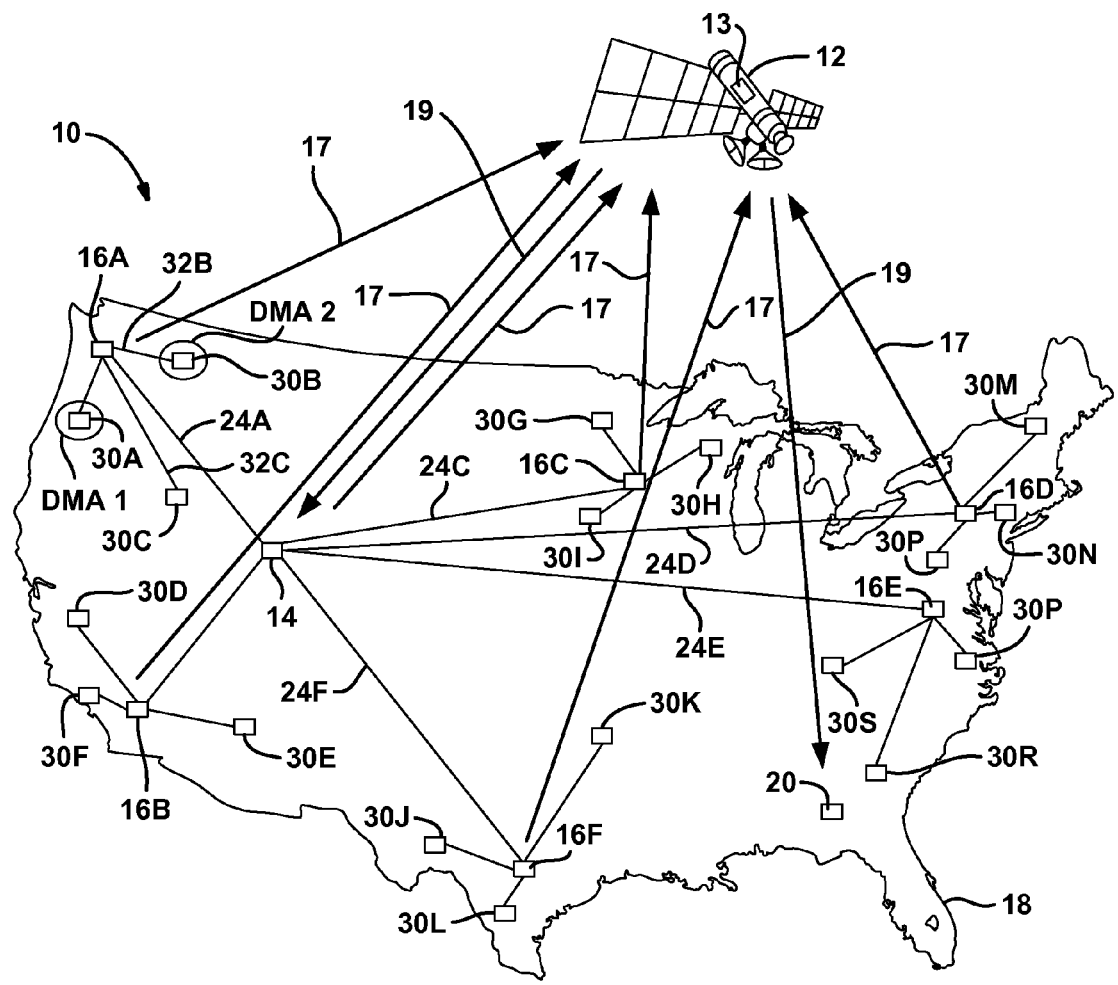
FIG. 1 is an overall system view of a collection and communication system in the continental United States.

The following description is merely exemplary in nature and is not intended to limit the present disclosure, application, or uses. It should be understood that throughout the drawings, corresponding reference numerals indicate like or corresponding parts and features.

As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

The present disclosure is described with respect to a satellite television system. However, the present disclosure may have various uses including satellite data transmission and reception for home or business uses. The system may also be used in a cable system or wireless terrestrial communication system.

Referring now to FIG. 1, a collection and communication system 10 includes a satellite 12 that includes at least one transponder 13. Typically, multiple transponders are in a satellite. Although only one satellite is shown, more than one is possible or even likely.

The collection and communication system 10 includes a central facility or Network operations center (NOC) 14 and a plurality of regional or remote uplink facilities (RUF) 16A, 16B, 16C, 16D, 16E and 16F. In a non-satellite system the facilities may be referred to as a remote facility. The regional or remote uplink facilities 16A-16F may be located at various locations throughout a landmass 18 such as the continental United States, including more or less than those illustrated. The regional or remote uplink facilities 16A-16F uplink various uplink signals 17 to satellite 12. The satellites downlink signals 19 to various users 20 that may be located in different areas of the landmass 18. The users 20 may be mobile or fixed users. The uplink signals 17 may be digital signals such as digital television signals or digital data signals. The digital television signals may be high definition television signals, standard definition signals or combinations of both. Uplinking may be performed at various frequencies including Ka band. The present disclosure, however, is not limited to Ka band. However, Ka band is a suitable frequency example used throughout this disclosure. The central facility or NOC 14 may also receive downlink signals 19 corresponding to the uplink signals 17 from the various regional or remote uplink facilities and from itself for monitoring purposes. The central facility 14 may monitor and control the quality of all the signals broadcast from the system 10.

The central facility 14 may also be coupled to the regional or remote uplink facilities through a network such as a computer network having associated communication lines 24A-24F. Each communication line 24A-F is associated with a respective regional or remote uplink site 16. Communication lines 24A-24F are terrestrial-based lines. As will be further described below, all of the functions performed at the regional or remote uplink facilities may be controlled centrally at the central facility 14 as long as the associated communication line 24A-F is not interrupted. When a communication line 24A-F is interrupted, each regional or remote uplink site 16A-F may operate autonomously so that uplink signals may continually be provided to the satellite 12. Each of the regional or remote uplink and central facilities includes a transmitting and receiving antenna which is not shown for simplicity in FIG. 1.

Each of the regional or remote uplink facilities 16A-16F may also be in communication with a local collection facility collectively referred to with reference numeral 30. As illustrated in FIG. 1, three local collection facilities are associated with each remote uplink facility 16. For example, remote uplink facility 16A has local collection facilities 30A, 30B and 30C associated therewith. Local collection facilities 30D-30S are associated with one of the other remote uplink facilities 16B-16F. Although only three local collection facilities are illustrated for each remote uplink facility 16, numerous local collection facilities may be associated with each remote uplink facility 16. The number of local collection facilities 30 may be numerous, such as 40 for each remote uplink facility. The number of local collection facilities 30 is limited by the amount of equipment and the capabilities thereof associated with each remote uplink facility 16.

The local collection facilities 30 are used for collecting local television stations in various designated marketing areas (DMA). As is illustrated, local collection facility 30A is located in DMA1 and local collection facility 30B is located in DMA2. For simplicity, only two DMAs are illustrated. However, each local collection facility may be located in a DMA.

The local collection facilities 30 may be in communication with each remote uplink facility 16 through a communication network 32. As will be described below, the communication network 32 may be an internet protocol (IP) network. The signals from the local collection facilities 30 may thus be video-over-IP signals. Each of the remote uplink facilities 16 are in communication with each local collection facility 30 through the communication network 32. As is illustrated, local collection facility 30A is in communication with the remote uplink facility 16A through communication network 32A, while local collection facility 30B is in communication with the remote uplink facility 16A through communication network 32B, and so on.

Figure 2:
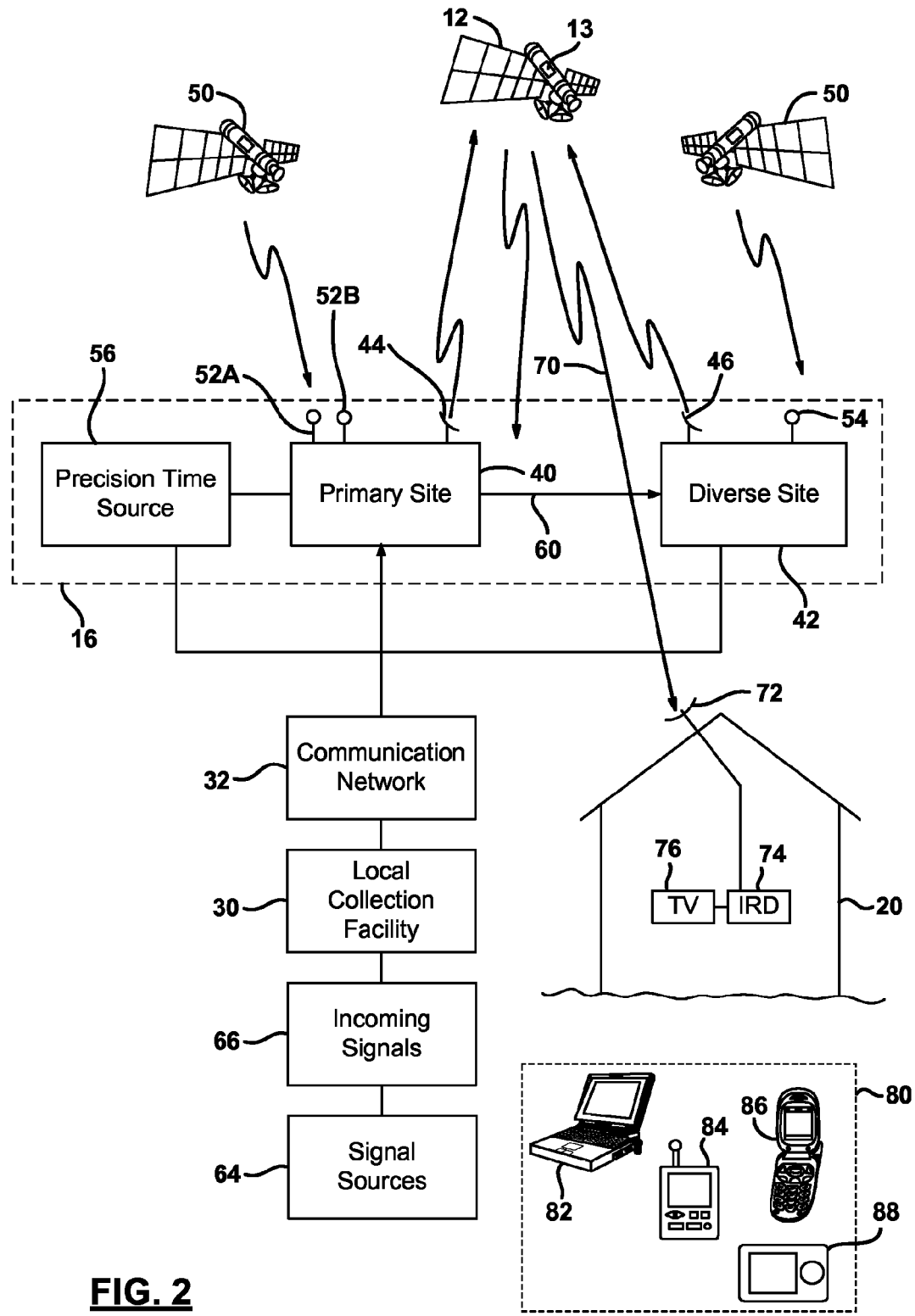
FIG. 2 is a system view at the regional level of the collection and communication system.

Referring now to FIG. 2, the regional or remote uplink facilities 16A-16F of FIG. 1 are illustrated collectively as reference numeral 16. The regional facilities 16 may actually comprise two facilities that include a primary site 40 (such as the remote uplink facility 16 above) and a diverse site 42. The primary site 40 may be referred to as a primary broadcast center (PBC). As will be described below, the central site 14 may also include a primary site and diverse site as is set forth herein. The primary site 40 and diverse site 42 of both the central and regional sites may be separated by at least 25 miles, or, more even more such as, at least 40 miles. In one constructed embodiment, 50 miles was used. The primary site 40 includes a first antenna 44 for transmitting and receiving signals to and from satellite 12. Diverse site 42 also includes an antenna 46 for transmitting and receiving signals from satellite 12.

Primary site 40 and diverse site 42 may also receive signals from GPS satellites 50. GPS satellites 50 generate signals corresponding to the location and a precision timed signal that may be provided to the primary site 40 through an antenna 52 and to the diverse site 42 through an antenna 54. It should be noted that redundant GPS antennas (52A,B) for each site may be provided. In some configurations, antennas 44 and 46 may also be used to receive GPS signals.

A precision time source 56 may also be coupled to the primary site 40 and to the diverse site 42 for providing a precision time source. The precision time source 56 may include various sources such as coupling to a central atomic clock. The precision time source 56 may be used to trigger certain events such as advertising insertions and the like.

The primary site 40 and the diverse site 42 may be coupled through a communication line 60. Communication line 60 may be a dedicated communication line. The primary site 40 and the diverse site 42 may communicate over the communication line using a video-over-Internet protocol (IP).

Various signal sources 64 such as an optical fiber line, copper line or antennas may provide incoming signals 66 to the local collection facility 30. Incoming signal 66, as mentioned above, may be television signals. The television signals may be over-the-air high-definition signals, over-the-air standard television signals, or high or standard definition signals received through a terrestrial communication line. The incoming signals 66 such as the television signals may be routed from the local collection facility 30 through the communication network 30 to the primary site 40, or the diverse site 42 in the event of a switchover. The switchover may be manual or a weather-related automatic switchover. A manual switchover, for example, may be used during a maintenance condition.

Users 20 receive downlink signals 70 corresponding to the television signals. Users 20 may include home-based systems, business-based systems or multiple dwelling unit systems. As illustrated, a user 20 has a receiving antenna 72 coupled to an integrated receiver decoder (IRD) 74 that processes the signals and generates audio and video signals corresponding to the received downlink signal 70 for display on the television or monitor 76. It should also be noted that satellite radio receiving systems may also be used in place of the RD 74. The integrated receiver decoder 74 may be incorporated into or may be referred to as a set top box.

The user 20 may also be a mobile user. The user 20 may therefore be implemented in a mobile device or portable device 80. The portable device 80 may include but are not limited to various types of devices such as a laptop computer 82, a personal digital assistant 84, a cellular telephone 86 or a portable media player 88.

Figure 3:
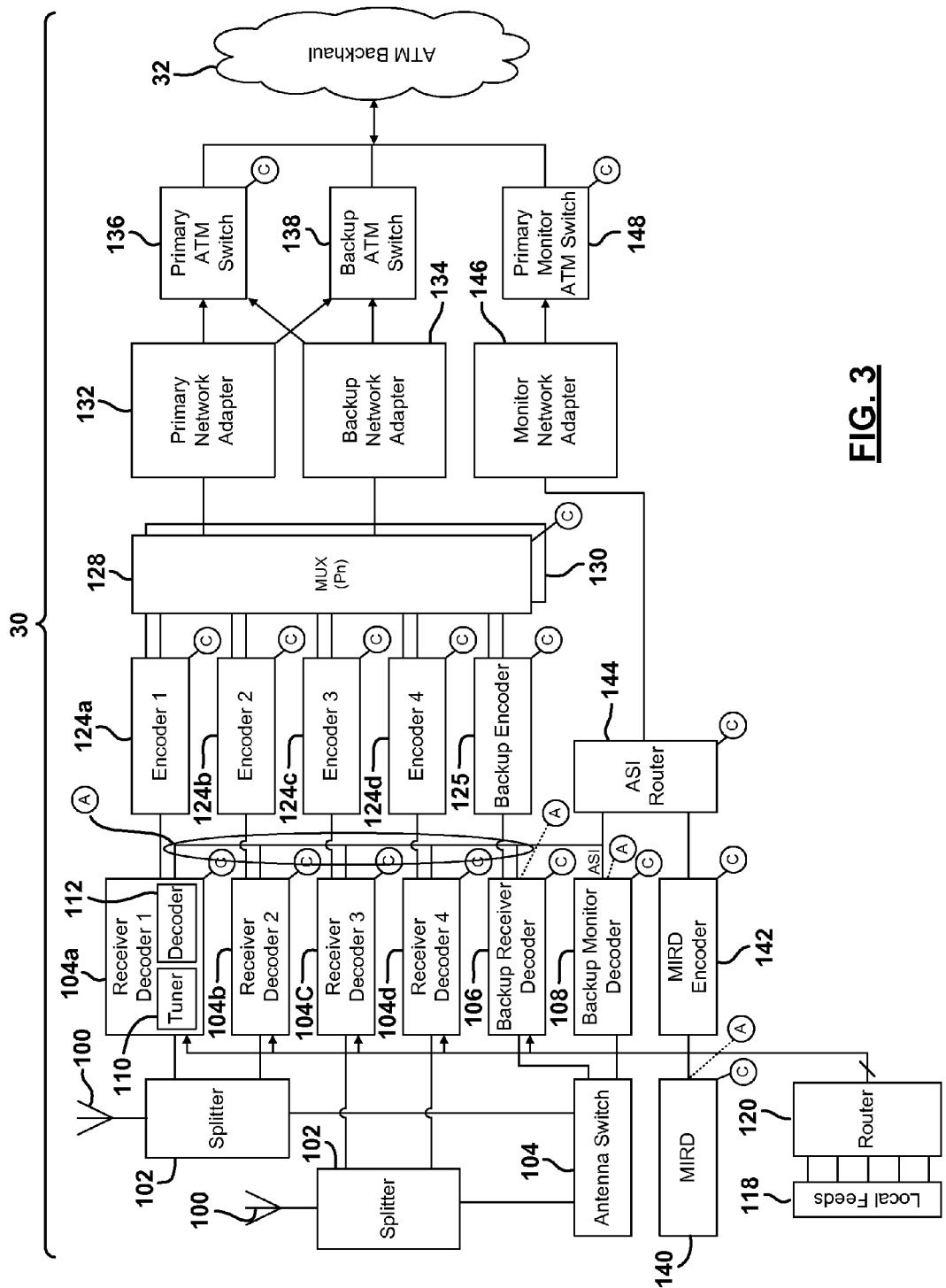
FIG. 3 is a detailed block diagrammatic view of a local collection facility illustrated in FIGS. 1 and 2.

Referring now to FIG. 3, the local collection facility 30 is illustrated in more detail adjacent to the remote uplink facility (RUF) 16. several remote facilities mar directed to one remote uplink facility. Several remote plink facilities may be located across the country. As mentioned above, the local collection facility 30 is in communication with the remote uplink facility 16 through a network 32 such as an ATM network. The local collection facility 30 is used for collecting signals in a designated marketing area or other area. The channel signals may be received as over-the-air television signals or through a direct local feed such as an optical fiber or wire. For an over-the-air signal, an antenna or plurality of antennas 100 are provided. The antenna channel signals are directed to splitters 102. The splitter signals are communicated to a plurality of receiver circuit modules 104A-D (collectively referred to as 104). The number of receiver circuit modules 104 depends upon various design parameters such as how many channels the designated market includes. Various numbers of receiver circuit modules 104 may be provided.

In addition to the receiver circuit modules 104A-D, a back-up receiver circuit module 106 may also be coupled to the splitters 102. Also, a monitor receiver circuit module 108 may be included at the local collection facility 108.

The receiver circuit modules generally 104, 106 and 108 include a tuner module 110 and a decoder module 112. The receiver circuit module 104 is used to tune, demodulate and decode the over-the-air signals. The tuner may be fixed-tuned to a particular channel or may be adjustable. The receiver circuit modules 104A-D are suitable for fixed tuning. The back-up receiver module 106 and monitor receiver circuit module 108 are particularly suited for multi-channel tuning. The receiver circuit modules, as will be described below may include an ATSC receiver or an NTSC receiver. In ATSC form the receiver receives an MPEG2 signal. The decoding may thus be MPEG2 decoding.

The receiver circuit modules 104 may generate a high definition serial digital interface signal (HD SDI) and an asynchronous serial interface (ASI) signal.

The back-up receiver circuit module 106 and the monitor receiver module 108 may be in communication with an antenna switch 114. The antenna switch 114 is in communication with the splitters 102 which are in communication with the antennas 100. The antenna switch 114 may be used to communicate the output of a particular antenna to the back-up receiver decoder 106 and the monitor receiver decoder 108. The back-up receiver decoder 106 may also generate both an HD SDI signal and an ASI signal. The monitor receiver module 108 may be used to generate only an ASI signal.

A serial digital interface router 120 may also be provided. The serial digital interface router 120 may be a high definition serial digital interface router. The router 120 may receive local feeds 118 directly from the local channel providers. The feeds may also be in MPEG2 format. These may be provided through a wire or optical fiber. The router 120 routes the channel signals received from the local feeds 118 to the receiver circuit modules 104, 106, 108 where received signals are decoded from MPEG2 format.

The received signals are processed and encoded into a format such an MPEG4 format in the encoders 124A-D. A back-up encoder 126 associated with the backup receiver decoder may also be provided.

The output of the encoders 124A-D, 126 are in communication with a primary multiplexer 128 and a back-up multiplexer 130. The primary multiplexer 128 an the back-up multiplexer 130 multiplex the encoded signals and provide them to a primary network adapter 132 and a back-up network adapter 134. Both the primary network adapter 132 and the back-up network adapter 134 may be in communication with the primary multiplexer 128 and the back-up multiplexer 130. The network adapters 132, 134 receive the multiplexed signals and format them into an asynchronous transfer mode (ATM) configuration. An ATM configuration typically includes cells of a fixed size with a header of 5 bytes and a payload of 48 bytes. The header may include a generic flow control field, a virtual path identifier, a virtual channel identifier, a payload type, a cell loss priority, and a header error control. Once the multiplexed signals are converted into an ATM format, the primary network adapter 132 or the back-up network adapter 132 routes the ATM signals through a primary ATM switch 136 or a back-up ATM switch 138. The primary ATM switch 136 and the back-up ATM switch 138 are used to route the ATM cells formed by the primary or network adapter from an input port to an output port to provide a connection between the switches 136 or 138 and the remote facility 16.

The local collection facility 30 may also include a monitoring integrated receiver decoder (MIRD) 140. The output of the monitoring IRD 140 may be provided to an MIRD encoder 142. The IRD 140 may also be referred to as a set top box. The monitoring IRD 140 receives downlinked satellite signals and converts these signals to a decoded signal (HD SDI, for example). The MIRD encoder 142 encodes the signals in a format such as MPEG 4 format.

The output of the monitor IRD encoder 142 may be provided to an ASI router 144. The ASI router 144 may route input signals from the decoders 104A-D, the back-up receiver decoder 106, the monitor receiver decoder 108 and the monitoring IRD encoder 142. The signals are routed through the router 144 for monitoring at a monitoring system, as will be described below. The monitoring system may also control the devices mentioned above through the router 144. Controlling may be switching to a backup. The monitoring system may also be in communication with the encoder 124A-D and 126, the multiplexers 128, 130 and the ATM switches 136-148. The output of the router is provided to a monitor network adapter 146 and a primary monitor ATM switch 148. The monitor network adapter 146 adapts the signal to the ATM format. The ATM format signals provided to the primary monitor ATM switch 148 which in turn communicates through the ATM backhaul 32.

Figure 4:
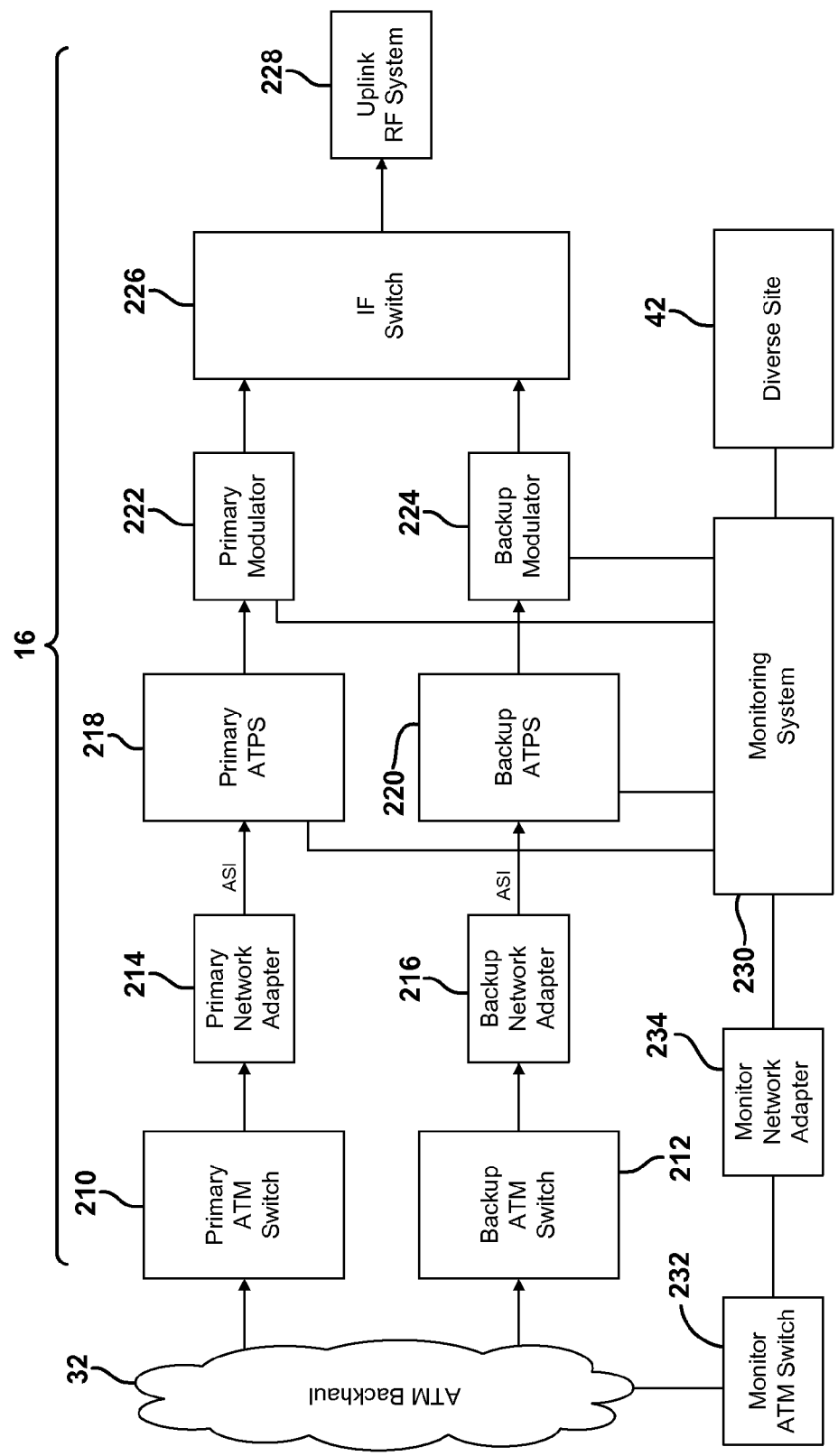
FIG. 4 is a detailed block diagrammatic view of a remote uplink facility.

Referring now to FIG. 4, the remote uplink facility 16 may include a primary ATM switch 210 and a back-up ATM switch 212 in communication with the ATM backhaul 32. The primary ATM switch 210 and the back-up ATM switch 212 are in communication through the ATM backhaul 32 with the primary ATM switch 136 and the back-up ATM switch 138. The primary ATM switch 210 is in communication with a primary network adapter 214. The back-up ATM switch 212 is in communication with a back-up network adapter 216. The network adapters 214 and 216 are used to generate an ASI signal that is communicated to a respective primary advanced transport processing system (ATPS) 218 and a back-up advanced transport processing system (ATPS) 220. The advanced transport processing systems 218, 220 convert the ASI signals from the network adapters into an advanced transport stream such as a DIRECTV® A3 transport stream. The ATPS 218, 220 may act as an encryption module for inserting encryption into the transport stream.

A primary modulator 222 and a back-up modulator 224 receive the transport stream from the respective primary ATPS 218 or the back-up ATPS 220. The primary modulator 222 and the back-up modulator 224 modulate the transport stream and generate an RF signal at a frequency such as an L-band frequency. An RF switch 226 may be referred to as an intermediate frequency switch 226. The RF switch provides one output signal to the uplink RF system 228. The uplink signal may then be communicated to the satellite 12 of FIG. 1. Should the system not be a satellite system, the signal may be communicated terrestrially through a distribution system in a wired or wireless manner. Several circuits 210-226 may be included in a remote facility 16, each one corresponding to one transponder on the satellite.

A monitoring system 230 may be in communication with a monitor ATM switch 232 and a monitor network adapter 234 for communicating with the various local collection facilities. In addition, the monitoring system 230 may be in communication with the primary ATPS 218, the back-up ATPS 220, the primary modulator 222 and the back-up modulator 224. In addition, the monitoring system 230 may be in communication with the router 144 illustrated in FIG. 3. The router 144 may be in communication with the monitor receiver circuit module 108, the monitor IRD encoder 142 and each of the receiver circuit modules 104, 106. The monitoring system 230 may be referred to as an advanced broadcast monitoring system 230.

It should be noted that multiple local collection facilities 30 may be coupled to a remote collection facility 16.

It should be noted that the diverse uplink facility or diverse site 54 illustrated in FIG. 4 may include a primary and back-up ATPS, a modulator and RF switch. The monitoring system may control the signals to the diverse site 42.

Figure 5:
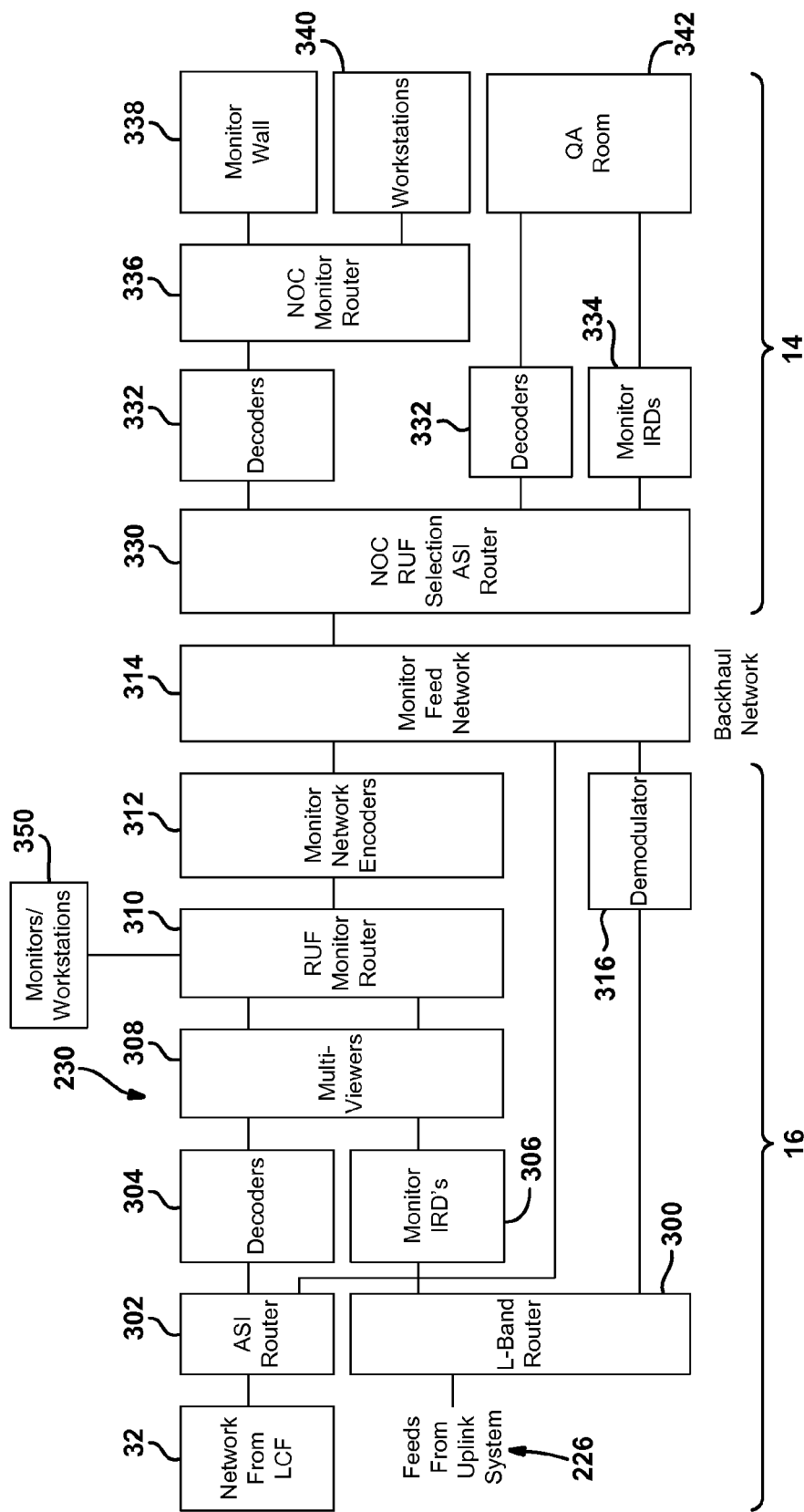
FIG. 5 is a block diagrammatic view of a monitoring system of FIG. 3.

Referring now to FIG. 5, the monitoring system 230 of FIG. 4 is illustrated in further detail. The monitoring system receives signals through the network 32. As mentioned above, feeds from various uplink systems such as various IF switches 226, may be provided to an L-band router 300. An ASI router 302 may be used to route the signals from the local collection facilities to a decoder 304. The decoder may be an ATSC decoder. Decoder 304 may be optional should the signals already be decoded at the local collection facility. The L-band router 300 may be in communication with a monitor IRD 306. The output of the monitor IRD 306 and the decoders 304 are provided to a multi-viewer or plurality of multi-viewers 308. A remote uplink facility monitor router 310 is used to provide signals to the monitor network encoders 312 which in turn provide signals to a monitor feed network 314. The L-band routers may also provide signals to a demodulator 316. The output of the demodulator 316 and the monitor network encoders 312 may be provided to the monitor feed network 314. The monitor feed network 314 may be various types of transmission means used to communicate between the remote uplink facilities 16 and the network operation center 14.

The remote uplink facility 16 may generate monitoring display 350 as well. The monitoring displays 350 may also be used to control the various functions at the local collection facilities. The monitoring displays may be in communication with the monitor router 310.

The network operation center 14 may include an ASI router 330 for the selection of signals from a particular remote uplink facility. The ASI signals may be routed to an ATSC decoder 332 and a monitor IRD 334. The ATSC decoder 332 may provide the signals to a monitor router 336. A monitor wall 338 may be used to generate monitoring signals for use at the network operation center. A workstation 340 may also receive the signals from the network operation center monitor router 336. The ATSC decoders 332 and the monitor IRDs 334 may provide the signals to a quality assurance (QA) room 342. Screen displays at the monitor wall 338, the workstation 340 and the quality assurance room 342 are used for monitoring the various remote uplink facilities. The workstation 340 may also be used for control purposes. Signals are provided to the remote uplink facility and ultimately to the local collection facilities should a problem arise with the signals. Ultimately the control signals may be communicated back through the network 32.

The network operation center 14 may also include multiple workstations 340 as well as a large monitor wall 338. The workstations 340 may have access to various control surfaces that can configure the monitor walls 338 as well as signals fed to the various monitors at the station.

Control of the on-air failure recovery devices as well as the monitoring functions for every LCF and RUF are accomplished through control surfaces such as touch screens and keyboards together with a GUI at the workstations 340 in the network operation center 14. The control surfaces may be application-specific and present the status and control options for various multiple configurations for the application. The quality assurance room 342 may not have any control functions therein. The monitors 350 may be coupled to the monitor network encoders 315 for displaying various views from the remote uplink facility and the local collection facilities.

It should be noted that if an ATM network is used for the signals, an ATM switch and network adapter may be provided prior to the ASI router 330. Further, the decoders 332 may be MPEG decoders since the signal may be in MPEG form when received from the remote uplink facility.

Figure 6:
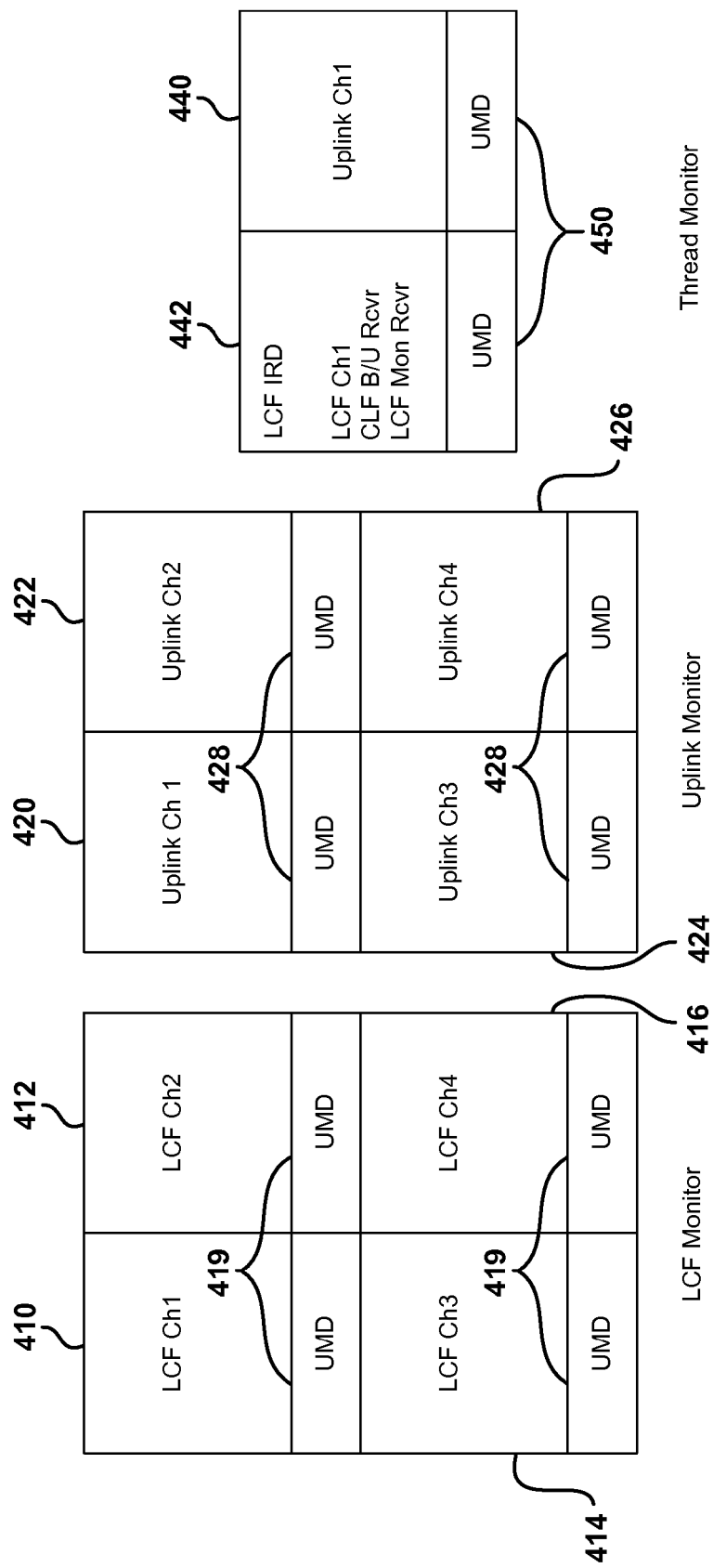
FIG. 6A is a plan view of a local collection receiver monitoring display.
FIG. 6B is a plan view of an uplink monitoring display.
FIG. 6C is a plan view of a thread monitoring display.

Referring now to FIG. 6A, a local collection facility monitor is generated having four local collection facility channels 410, 412, 414, and 416. Each display may also include an under-monitor display 418 used to identify the particular channel signal. The under-monitor displays 418 may display the actual channel number, the station identification or other information and the like.

In FIG. 6B, an uplink monitor is illustrated having an uplink channel one 420, an uplink channel two 422, an uplink channel three 424, and an uplink channel four 426. An under-monitor display 428 may also be included with each of the displays 420-426. The uplink channels receive the uplink channel signals so that they may be monitored. The uplink channel signals provide an indication as to the uplink channel. Various selections may be made for the particular uplink channels for the particular remote uplink facilities.

FIG. 6C includes an uplink channel signal 440 and a local collection facility IRD signal 442. The local collection facility IRD signal 442 may be received through the monitoring IRD located at the local collection facility. This is illustrated in FIG. 3 as reference numeral 140. The display may also display a channel from the local collection facility, the back-up receiver channel or the local collection facility monitor receiver. Both displays 440 and 442 may include an under-monitor display 450.

Figure 7:
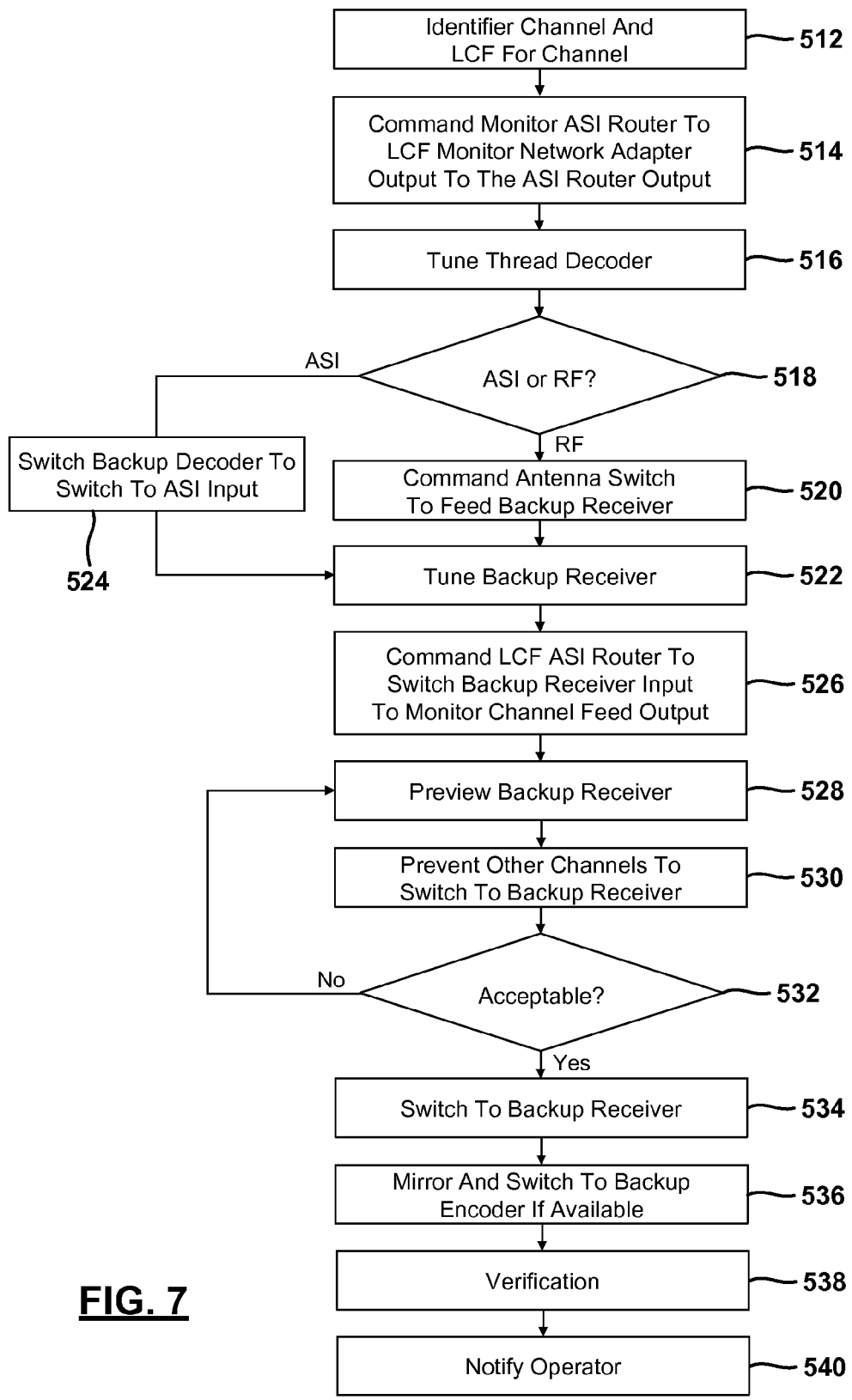
FIG. 7 is a flowchart illustrating a method for controlling a back-up receiver decoder circuit module at the local collection facility from a remote facility.

Referring now to FIG. 7, a method for changing or controlling a back-up receiver at a local collection facility from a remote collection facility is illustrated. In step 512, the monitoring system 230 identifies a channel and a local collection facility associated with the channel. This may be performed at a broadcast operation center channel or the like. This may also be performed at the network operation center 14. The channel may be identified by using the various monitors at the network operation center or the remote uplink facility as described above.

In step 514, the method includes commanding the monitor ASI router 302 of FIG. 5 to switch to the router input corresponding to the designated LCF monitor network adapter output to the ASI router output defined for the requesting console thread decoder input. The thread decoder may then be tuned to the station identification defined for the local channel source for the broadcast operation center in step 516. In step 518, it is determined whether the signal is an ASI signal received through a direct feed or an RF signal communicated through an RF antenna. In step 520, if the signal is an RF signal, the antenna switch 144 of FIG. 3 is commanded to feed the back-up receiver and the back-up receiver module 108 is tuned in step 522. It should be noted that the back-up receiver may be tunable, whereas the other receivers in the receiver circuit modules 104 may be fixed-tuned.

Referring back to step 518, if the signal is an ASI signal, the back-up receiver module is switched to the particular ASI input. After step 524, the back-up receiver is tuned in step 522.

In step 526, the local collection facility ASI router is commanded to switch to the back-up receiver input to monitor the channel feed output at the network adapter. In step 528, a preview of the back-up signals is provided at the remote uplink facility. As mentioned above, the signal may also be provided to the network operation center.

In step 530, other channels are prevented to switch to the back-up receiver. In step 532, if the signal is not acceptable a preview is continued in step 528. In step 532, if the previewed signal is acceptable a switch to the back-up receiver is performed in step 534. In step 538, the monitoring system commands the system to mirror and switch to the back-up encoder if available. Mirroring means communicating any of the set-up configuration parameters from the receiver circuit module in question to the backup receiver circuit module. In step 538, if verification is received that the back-up encoder has been employed in the broadcast signal. In step 540, a notification is provided to the operation that a successful transition to the back-up encoder is provided.

Figure 8:
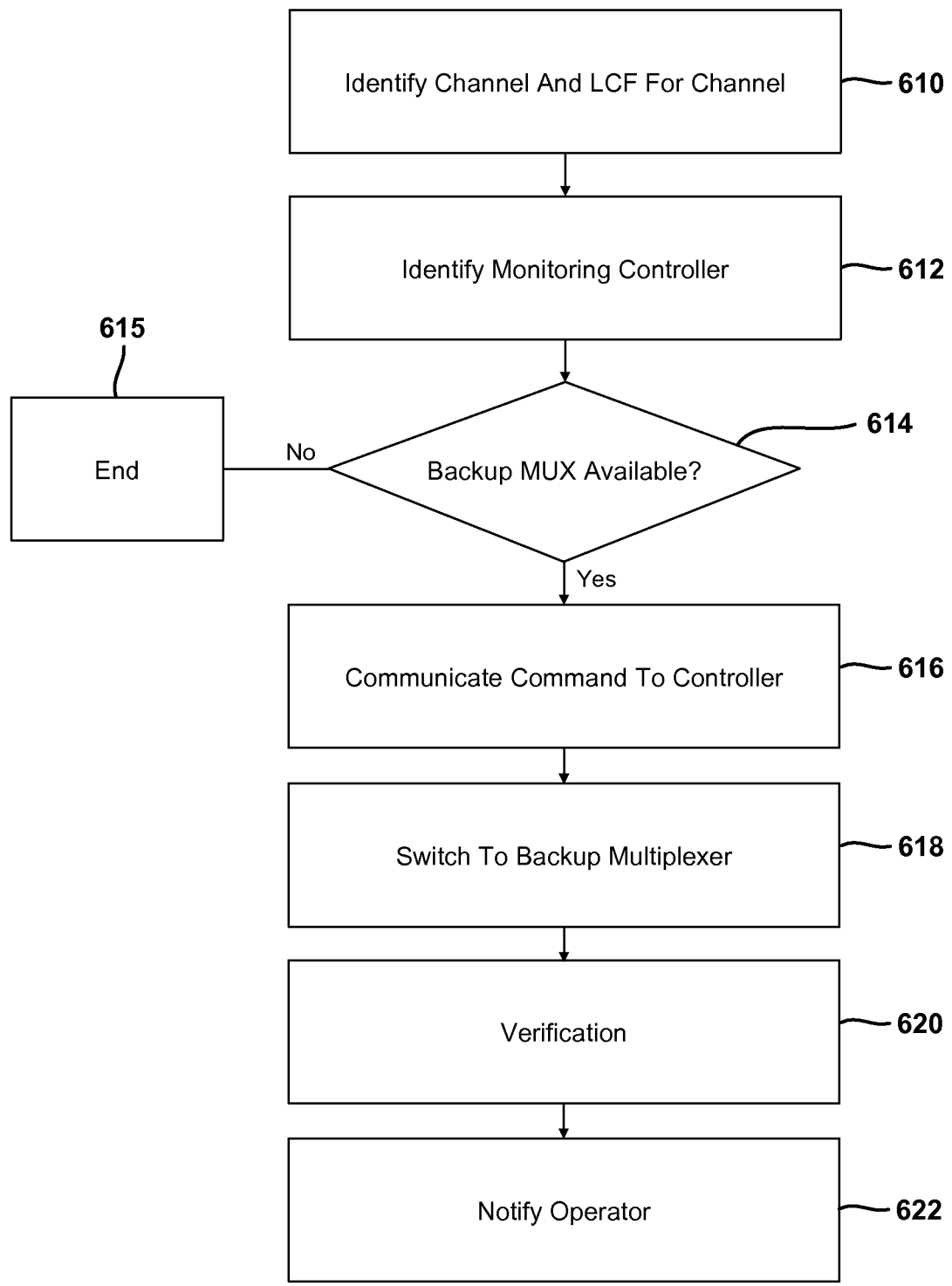
FIG. 8 is a flowchart of a method for switching to a back-up multiplexer at the local collection facility from a remote facility.

Referring now to FIG. 8, a method for switching to a back-up multiplexer is set forth. In step 610, a channel is identified and the local collection facility for the channel is identified at either the remote uplink facility or the network operation center.

In step 612, a compression system and monitoring system is used associated with the channel is identified. In step 614, if a back-up multiplexer is not available the system ends in step 615. In step 614, if a back-up multiplexer is available a command is communicated to the monitoring system controller. In step 618, a switch to the back-up multiplexer is generated while the primary multiplexer is disabled. In step 620, a verification is provided to the operator that a successful switch to the multiplexer has been provided.

In step 622, a notification is provided to the operator that a successful switch to the back-up multiplexer is provided.

It should be noted that the above method may also be used to switch from the back-up multiplexer to the primary multiplexer.

Figure 9:
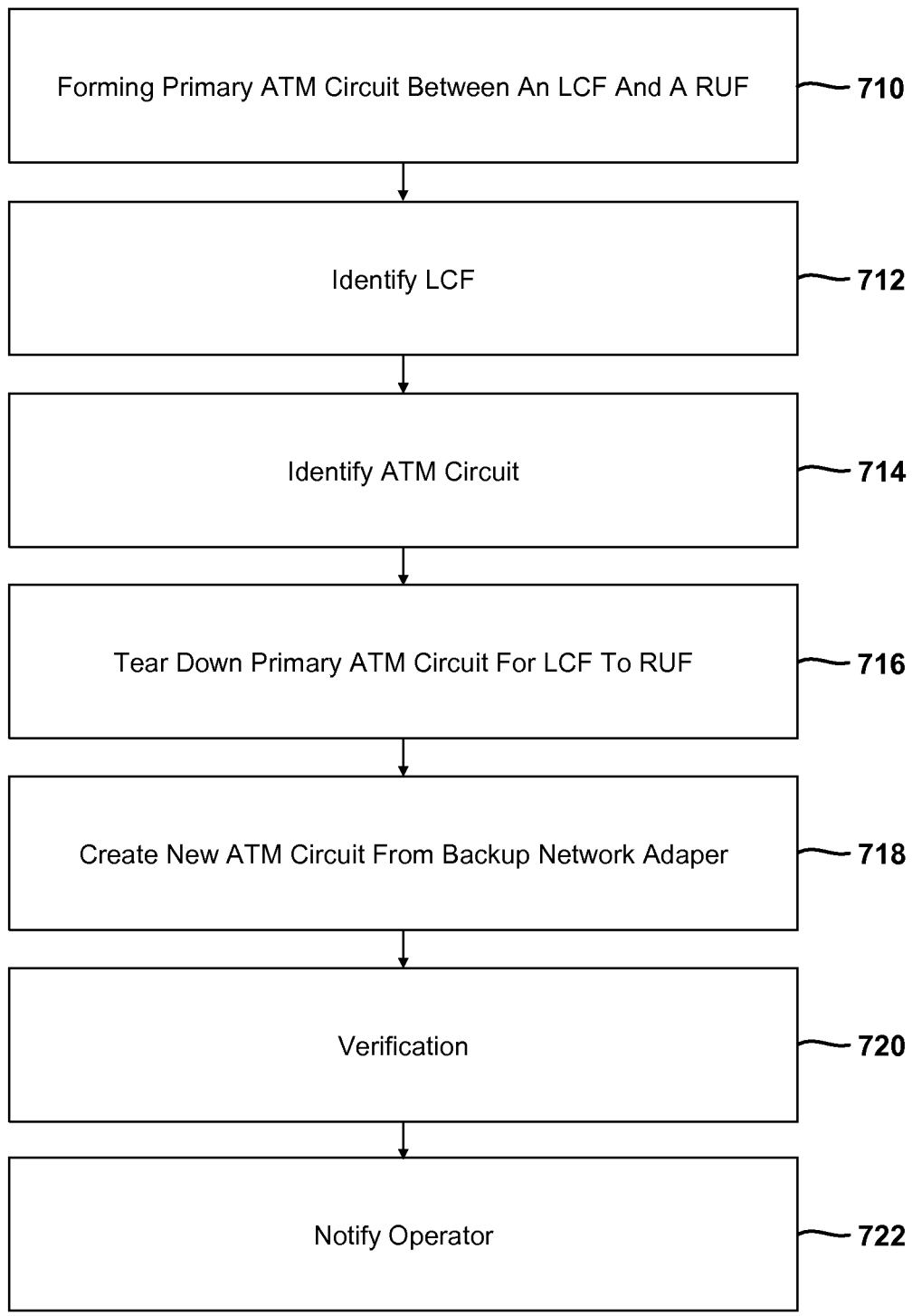
FIG. 9 is of a method for switching to a back-up network adapter at the local collection facility from a remote facility.

Referring now to FIG. 9, a method for switching to a network adapter is provided. In step 710, a primary ATM circuit is formed between the local collection facility and the remote uplink facility. In step 712, when a change is desired the local collection facility is identified. In step 714, the ATM circuit associated with the local collection facility is also identified.

In step 716, the primary ATM circuit for the LCF to RUF connection is torn down. In step 718, a new ATM circuit from the back-up network adapter is created. In step 720, a verification may be provided to the network operator that a successful switch from the primary network adapter to the back-up network adapter has been performed by creating and tearing down a new ATM circuit and the primary ATM circuit. In step 720, a verification may be generated. In step 722, the operator of the system may be notified.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method of forming an output signal comprising:
providing a plurality of primary receiver decoder circuit modules at a local collection facility, said plurality of primary receiver decoder circuit modules comprising a first receiver decoder circuit module;
receiving a plurality of channel signals, said plurality of channel signals having a first channel signal, wherein the first channel signal has a first Moving Pictures Expert Group (MPEG) format;
communicating the first channel signal to the first receiver decoder circuit module;
decoding the first channel signal to form a first decoded signal into one of a high definition serial digital interface signal and an asynchronous serial digital interface (ASI) signal;
encoding the first decoded signal at a first encoder module into a first encoded signal having a second MPEG format, wherein the second MPEG format is different than the first MPEG format;
multiplexing the first encoded signal into a multiplexed signal;
forming an asynchronous transfer mode (ATM) signal from the multiplexed signal at a network adapter;
communicating the ATM signal from the local collection facility through an ATM network backhaul to a remote facility; and
generating an output signal at the remote facility in response to the ATM signal.

2. A method as recited in claim 1 wherein generating the output signal comprises receiving the ATM signal at a remote ATM switch to form a remote ATM signal;
forming a serial signal at the network adapter from the remote ATM signal; and
forming a transport signal from the serial signal.

3. A method as recited in claim 2 further comprising:
modulating the transport signal to form a modulated signal; and
uplinking the modulated signal to a satellite.

4. A method as recited in claim 1 wherein decoding the first channel signal comprises decoding the first channel signal to form the first decoded signal in a high definition serial digital interface format and a second signal in an ASI format.

5. A method as recited in claim 1 wherein decoding the first channel signal comprises decoding the first channel signal to form the first decoded signal and a monitoring signal and communicating the monitoring signal of the first receiver decoder circuit module to a monitoring system.

6. A method as recited in claim 1 wherein the first receiver decoder circuit module comprises a demodulator and fixed tuner.

7. A method as recited in claim 1 wherein each of the plurality of receiver decoder circuit modules corresponds to a respective one of the plurality of channels.

8. A method as recited in claim 1 wherein the first channel signal comprises a high definition terrestrial over-the air channel signal received through an antenna.

9. A method as recited in claim 1 wherein the first channel signal comprises a local channel signal received through wired or optical connection.

10. A method as recited in claim 1 wherein receiving the plurality of channel signals comprises receiving a plurality of channel signals from a designated marketing area.

11. The method of claim 1 wherein:
the first MPEG format is a MPEG-2 format; and
the second MPEG format is a MPEG-4 format.

12. The method of claim 1 further comprising:
receiving local feeds from local channel providers at a router;
receiving the local feeds at the plurality of primary receiver decoder circuit modules;
decoding the local feeds via the plurality of primary receiver decoder circuit modules to generate decoded signals;
encoding the decoded signals to generate encoded signals; and
multiplexing the encoded signals into the multiplexed signal.

13. The method of claim 12 wherein:
the local feeds are in the first MPEG format; and
the local feeds are provided via wire or optical fiber.

14. The method of claim 1 further comprising:
communicating the plurality of channel signals to the plurality of primary receiver decoder circuit modules, wherein the plurality of channel signals are over-the-air television signals;
decoding the plurality of channel signals to form decoded signals, wherein each of the decoded signals is one of the high definition serial digital interface signal and the asynchronous serial interface signal;
encoding the decoded signals at respective encoder modules to generate encoded signals, wherein each of the encoded signals has the second MPEG format;
receiving the encoded signals from each of the encoder modules at a multiplexer; and
multiplexing the encoded signals to generate the multiplexed signal.

15. The method of claim 14 further comprising:
routing the multiplexed signal via the network adapter to a selected one of a plurality of switches, wherein the plurality of switches include a primary switch and a backup switch; and
transferring output of the plurality of switches to the ATM network backhaul.

16. The method of claim 15 further comprising:
multiplexing the encoded signals with encoded backup signals to generate a second multiplexed signal; and
receiving the second multiplexed signal at a backup adapter,
wherein the network adapter and the backup adapter share the plurality of switches.

17. A system comprising:
a local collection facility comprising
a plurality of primary receiver decoder circuit modules comprising a first receiver decoder circuit module,
said first receiver decoder circuit module receiving a first channel signal and forming a first decoded signal into one of a high definition serial digital interface signal and an asynchronous serial digital interface signal, wherein the first channel signal has a first Moving Pictures Expert Group (MPEG) format,
an encoder in communication with the first receiver decoder circuit module forming a first encoded signal having a second MPEG format from the first decoded signal, wherein the second MPEG format is different than the first MPEG format, and
a multiplexer multiplexing the first encoded signal into a multiplexed signal; a network adapter converting the multiplexed signal into an ATM signal; and an ATM switch communicating the ATM signal through a network; and wherein a remote facility in communication with the local collection facility generates an output signal in response to the ATM signal.

18. A system as recited in claim 17 wherein the local collection facility comprises a plurality of local collection facilities generating a plurality of ATM signals, the remote facility in communication with the plurality of local collection facilities generate the output signal in response to the plurality of ATM signals.

19. A system as recited in claim 18 wherein the first receiver decoder circuit module decodes the first channel signal into the first decoded signal and a monitoring signal, said local collection facility communicating the monitoring signal to a monitoring system in the remote facility.

20. A system as recited in claim 17 wherein each of the plurality of primary receiver decoder circuit modules corresponds to a respective one of a plurality of channels.

21. A system recited in claim 17 wherein the first channel signal comprises a terrestrial over-the-air channel signal received through an antenna.

22. A system as recited in claim 17 wherein the first channel signal comprises a local channel signal received through wired or optical connection.

23. A system comprising:
a plurality of local collection facilities, each a local collection facility comprising
a plurality of primary receiver decoder circuit modules comprising a first receiver decoder circuit module;
said first receiver decoder circuit module receiving a first channel signal and forming a first decoded signal into one of a high definition serial digital interface signal and an asynchronous serial digital interface signal, wherein the first channel signal has a first Moving Pictures Expert Group (MPEG) format;
an encoder in communication with the first receiver decoder circuit module forming a first encoded signal having a second MPEG format, wherein the second MPEG format is different than the first MPEG format;
a multiplexer multiplexing the first encoded signal into a multiplexed signal; and
a network switch communicating the multiplexed signal through a network,
wherein said plurality of local collection facilities communicate a plurality of multiplexed signals through the network; and
a remote facility in communication with the plurality of local collection facilities generating an output signal in response to the plurality of multiplexed signals.

* * * * *